May 6, 1958 J. A. VILLE 2,833,856

PULSE TRANSMISSION TELECOMMUNICATION SYSTEMS

Filed Dec. 13, 1954 3 Sheets-Sheet 1

May 6, 1958 J. A. VILLE 2,833,856

PULSE TRANSMISSION TELECOMMUNICATION SYSTEMS

Filed Dec. 13, 1954 3 Sheets-Sheet 3

United States Patent Office 2,833,856

Patented May 6, 1958

2,833,856

PULSE TRANSMISSION TELECOMMUNICATION SYSTEMS

Jean André Ville, Paris, France, assignor to Societe Alsacienne de Constructions Mecaniques, Paris, France Application December 13, 1954, Serial No. 474,753

Claims priority, application France December 31, 1953

7 Claims. (Cl. 178—43.5)

The present invention concerns systems for the transmission of intelligence signals by means of coded pulses and more particularly of "divalent" pulses generated in a recurrent manner. It concerns those systems in which the "value," i. e. the signalling condition of each pulse is determined by a comparison of the respective instantaneous amplitudes of the signal to be transmitted and of a so-called comparison signal generated locally, at the sending end of the transmission system from the divalent pulses themselves.

In these systems, the pulses may have a constant amplitude, their individual values being differentiated by their polarities. It is known that the pulses effectively transmitted between a sending station and a receiving station may also be differentiated by another characteristic than polarity, for instance their presence or absence. Further, it is easy to transform a sequence of recurrent signalling pulses with a variable polarity into a sequence of pulses which are also recurrent individually and characterized, for instance by their presence or absence, or vice-versa.

It is also known that, for facilitating the carrying out of the above mentioned amplitude comparison, it is advantageous that the signal to be transmitted and the comparison signal have a constant polarity, which can easily be obtained by adding to them a permanent D. C. component of a suitable amplitude. An amplitude comparator, operated by two signals having the same polarity, delivers directly a different signal, the polarity of which determines the value of each one of the successive signalling pulses.

Systems are known, in particular, in which the comparison signal is generated by a simple time integration of the pulses sent. In these systems, the values of the successive pulses depend largely on one another. A faithful reconstitution of the signal transmitted by an integration of the pulses received, at the receiving station, then involves a high repetition frequency for the pulses. In fact, in these systems, each newly generated pulse extends, due to its being integrated, the comparison signal according to a slope which has always the same absolute value. The comparison signal assumes a stepped shape with steps of equal heights, so that it is necessary to have very numerous pulses available, and, consequently very close steps in order to follow exactly the wave shape of the signal to be transmitted.

Systems are also known in which the reconstitution of the signal at the receiving station is obtained by a double integration. It is known that it is not possible, then, at the sending station, to determine the values of the pulses by a direct comparison between the signal to be transmitted and the comparison signal generated by a double integration, as a device for performing such an operation would be unstable. Some known systems include means for obviating this difficulty. In one of these systems, the comparison signal is generated by a simple integration, but there is substituted to the signal to be transmitted, before effecting the comparison, a mixture of this signal and of the signal differentiated with respect to time. According to another one of these systems, there is substituted for the two integrations a linear operation of the same kind, preserving the stability conditions of the system which should remain stable at all frequencies.

Such systems make it possible to decrease, for an equal accuracy of reproduction of the signal transmitted, the repetition frequency of the pulses.

It is also known (see a communication of J. A. Ville at the "Congrès des Impulsions," Paris, October 1953, published by the Société des Radio-electriciens in "Colloque sur la Theorie et la Technique des Impulsions"), that it is possible, to increase the flow of information carried by a sequence of divalent signalling pulses beyond the limits reached practically in the above mentioned known systems, without going out of the field of linear operations.

An object of the present invention is to utilize this property for decreasing the repetition frequency of the pulses used in a system of the type mentioned for an equal accuracy of reproduction of the transmitted signal, by making these pulses still less dependent on one another, and by thus increasing the flow of information transmitted.

Alternately, according to another aspect of the object of the invention, it is possible to increase the number of possible distinct amplitudes of the reconstituted signal at a given repetition frequency of the pulses.

The understanding of the invention will be facilitated by a statement of the following theoretical principles on which it is based.

Let $t$ be the time, $s(t)$ a signal to be transmitted and $\sigma(t)$ a comparison signal to which permanent D. C. components have been added with such amplitudes that their polarities remain constant.

A comparison is effected periodically, at a repetition frequency $f_0=1/\tau$, of the instantaneous amplitudes of these two signals so as to generate a signal having a constant amplitude and a variable polarity defined by the sign of $(s(t)-\sigma(t))$.

A generator delivers recurrent pulses of constant amplitude with a repetition frequency $f_0$. These pulses are then sent with an individual polarity depending on the information signal to be transmitted so as to form a sequence of signalling pulses with a variable polarity which will be designated by $\epsilon_n$. The subscript $n$ indicates the rank of each pulse, up to the $n$th one which is the last one formed. $\epsilon$, by convention, designates any constant amplitude which may be assigned a plus or a minus sign.

The pulse sequence $\epsilon_n$ may be broken up into two sequences, one, $(\epsilon_n)$ containing only pulses with a positive polarity and the other one $(\epsilon_n)$—containing only pulses with a negative polarity. For transmitting to a receiving station the information contained in the complete sequence, is it obviously sufficient to transmit one of the sequences of intermittent pulses, for instance the sequence $(\epsilon_n)$, the complete sequence being possibly reconstituted at the receiving end by replacing the absent pulses by locally generated pulses with suitable polarities.

According to a first characteristic of the invention, there is effected, at a given instant, a weighted sum $\delta_n$ of the sequence $\epsilon_n$ of the pulses already transmitted at that instant: this means the algebraic sum of the amplitudes of the pulses from the last one sent, each one of them being assigned a particular reduction coefficient $k_n$. According to a preferred characteristic of this weighted summation, the coefficient $k_n$ has the form $k^{(p-1)}$, $p$ being the rank of the pulse considered, starting from the last one, and thus the summation is effected:

$$\delta_n=\sum_{p=1}^{\infty}k^{p-1}\epsilon_{n-p}$$

for constituting a signal $\delta_n$. According to another characteristic of the invention, the signal $\delta_n$ thus obtained, with a variable amplitude and a variable polarity, is rectified so as to give an auxiliary signal $\Delta_n=|\delta_n|$ with a variable amplitude but a constant polarity.

According to a third characteristic of the invention, the pulses of the sequence $\epsilon_n$ are amplitude-modulated by the signal $\Delta_n$ and the result of this modulation is subjected to a time integration. There is thus obtained, except for a D. C. component, a so-called comparison signal $\sigma(t)$.

The integration mentioned, effected by a suitable electric network, is not, practically, strictly speaking, an integration, but it may be represented by a weighted summation, with a weighting coefficient $h$ close to unity. The comparison signal, therefore, may be represented by the expression:

$$A.\quad \sum_{p=1}^{\infty} h^{p-1}\epsilon_{n-p}\left|\sum_{q=1}^{\infty} k^{q-1}\epsilon_{n-p-q}\right|+\sigma_0$$

where A is an amplitude coefficient and $\sigma_0$ a D. C. component added so as to make the polarity of the comparison signal constant.

The instantaneous amplitudes of this comparison signal and of the signal $s(t)$ (to which a D. C. component with a suitable amplitude has been added); are compared, as has been mentioned, so as to generate the pulse sequence $\epsilon_n$, the device the principle of which has been described thus operated in a closed chain. A pulse is finally sent, after each comparison, according to the sign of $[s(t)-\sigma(t)]$.

In accordance with the invention, there is provided, in an intelligence transmission device in which the intelligence signal to be transmitted (to which there has been added such a direct-current component that the polarity of said signal remains constant) and a comparison signal also of constant polarity, are applied to an amplitude comparator delivering, at its output, periodically recurrent signalling pulses with a constant amplitude but a variable polarity, according to whether the instantaneous amplitude of the signals exceeds that of the comparison signal, each means for rectifying the signal of variable amplitude and polarity thus obtained so as to obtain an auxiliary control signal, means for modulating in amplitude said pulses polarity-modulated proportionally to amplitude of said control signal, means for forming an electric voltage proportional to be time integral of said control signal, means for adding to the voltage thus obtained a direct-current component of such an amplitude that its polarity be constant, the resulting signal thus obtained constituting said comparison signal, and means for applying to a transmission circuit all or part of said signalling pulses.

The invention also extends to a receiver for recurrent divalent pulses in which the signal to be received is reconstituted by the same means of weighted summation, of rectification, amplitude modulation and integration as those used at the sending end.

According to a preferred mode of embodiment of the invention the pulse reduction coefficients, in the weighted summation are such that the reduced values of the successive pulses, starting from the last one and going back in time, decrease exponentially.

The present invention is described in greater detail hereinafter with reference to the appended drawings illustrating an example of embodiment and wherein.

Figure 1:
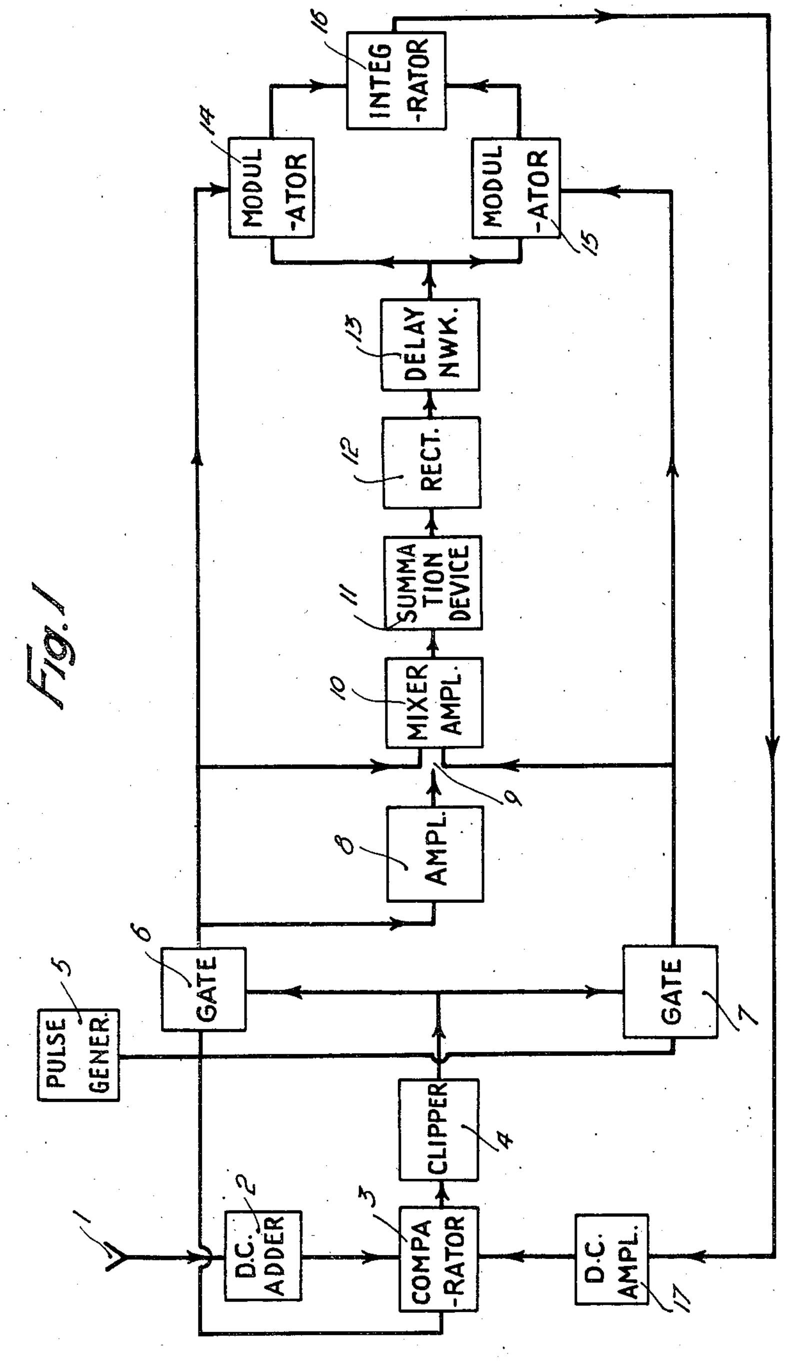
Figure 1 shows, diagrammatically, a one wire diagram of a sending device.

In Figure 1, 1 represents the terminals of the circuit to which the signal to be transmitted is applied; 2 designates a device in which there is added, to the signal to be transmitted, such a direct-current component that the polarity of the modified signal resulting therefrom be constant, positive for example; 3 is a "comparator" or differential device to which are applied, on the one hand, the previous signal to be modified, on the other hand a comparison signal the mode of generation of which will be explained hereinafter; the difference signal delivered by 3 is applied to a clipping amplifier 4 which delivers, at its output, a step-shaped signal in which the polarity reversals correspond to reversals in the sign of the difference signal. The operation of comparator 3 is controlled by pulses issued from a generator S of recurrent periodic pulses; 6 and 7 represent two electronic gates controlled by the step-shaped signal and which are respectively conducting when said signal is positive for one of them, negative for the other one; to these two gates, there are applied pulses delivered by the generator 5.

The signalling pulses of positive polarity are applied to a coupling amplifier 8 and applied to the terminals of the transmission circuit 9 to the receiving station.

The whole of the signalling pulses, respectively positive and negative are applied to a mixer amplifier 10 which receives a sequence of signalling pulses of both polarities. 11 represents a device for the weighted summation of the said pulses, 12 is a rectifier, and 13 a delay network.

14 and 15 represent two amplitude modulators controlled respectively by the pulses, positive for the one, negative for the other one, delivered by the electronic gates 6 and 7 and to which is applied the signal after summation, rectification and delaying by 11, 12 and 13.

16 represents an integrator device with two inputs, to which are respectively applied the polarity and amplitude modulated pulses, delivered by the modulators 14 and 15. 16 delivers as integrated signal with a variable polarity, to which has been added, in 17, a D. C. component with such an amplitude that the polarity of the resulting signal be constant. The resulting signal constitutes the comparison signal applied, as has been stated, to the comparator device 3.

This device operates as follows:

The comparison in 3 of the modified signal to be transmitted with the comparison signal supplies a signal with a variable amplitude and the instantaneous polarity of which depends on the sign of the algebraic difference of the two instantaneous amplitudes of the signals being compared. The effect of the clipper 4 is to eliminate the amplitude variations and to deliver a step-shaped signal with sudden polarity reversals. This signal controls the electronic gates 6 and 7. 6 passes the pulses delivered by the generator 5 when the step-shaped signal and, consequently, the sign of the difference between the instantaneous amplitudes of the modified signal to be transmitted and of the comparison signal (with their D. C. components added) is positive. 7 passes the pulses when this sign is negative. The positive pulses are transmitted to the receiving station 9 by means of the amplifier 8.

The complete sequence of pulses, both positive and negative, i. e. a sequence of recurrent pulses with a constant amplitude and "modulated" in polarity, obtained by mixing in the mixer amplifier 10 is summed in the weighted summation device 11. The latter receives the pulses as they are formed, and preserves them, applying to them an exponential decreasing, in time. It also elaborates, in a continuous manner, the sum of the amplitudes of the pulses it preserves. This sum is a signal the amplitude and polarity of which vary.

The rectifier 12 rectifies this signal so as to preserve the positive portions of the signals and to convert the negative portions into positive portions. The auxiliary signal thus obtained is delayed through the delay network 13. In order to effect an integration (as will be explained hereinafter) which will be controlled by pulses which, except for delays inherent to the elements, will be in phase with the pulses delivered by 5, it is necessary to delay the signal resulting from the summation already effected up to the instant of the next pulse. The delay caused by 13 is equal, therefore, to the interval separating the instants corresponding to two successive pulses, corrected for the delay inherent to the elements of the assembly of elements involved.

The sequences of intermittent pulses, respectively positive and negative, delivered by the electronic gates 6 and 7 are amplitude modulated in the modulators 14 and 15 by the delayed auxiliary signal delivered by 13. There are thus obtained two sequences of amplitude modulated pulses, complementary in time and with opposite polarities. 16 is an integrator network which elaborates in a continuous manner the algebraic sum of the amplitudes of said pulses, i. e. effects their integration in time. Due to the fact that this network does not keep the former pulses indefinitely, this integration is, in fact, a weighted summation, like the previous one, but with a reduction coefficient of the amplitudes as a function of their rank counted towards the past, much smaller than in the first, above mentioned weighted summation.

A signal is thus obtained to which a D. C. component is added in 17, so as to obtain a comparison signal having a constant polarity and varying between limits compatible with the limits between which varies the modified signal formed by the signal to be transmitted and its added D. C. component, with a view to comparing their amplitudes.

The comparison signal thus results from the integration of pulses which, themselves, are amplitude modulated. When the system, operating spontaneously in a closed chain, generates successively several pulses of one polarity, this means the comparison signal remains, during this time, lower than the modified signal to be transmitted. It must, therefore, tend to catch up as rapidly as possible with the amplitude of the latter signal and to exceed it. The weighted summation provides a signal the amplitude of which increases with time. The auxiliary control signal obtained by rectification also has, therefore, an increasing amplitude, and the amplitude modulation increases, in an increasing manner, the amplitudes of the pulses which are integrated. As a result, the integrated signal varies in steps of increasing amplitudes, which decreases the number of pulses at the end of which this signal will have caught up, in amplitude, with the signal to be transmitted.

If, on the contrary, the comparison signal has an amplitude which is now lower, now higher than that of the modified signal to be transmitted, the weighted summation gives a signal which varies rapidly in amplitude and in sign. The amplitude of the auxiliary control signal is no longer the maximum amplitude and the amplitude modulation delivers to the integrator pulses having a reduced amplitude. The integrator, receiving pulses varying in sign and of reduced amplitude, generates a comparison signal the variations of which follow very closely those of the signal to be transmitted.

It may be said that, in the time intervals during which the comparison signal has allowed the modified signal to be transmitted to overtake it, it preserves a memory of the successive operations and uses it for cutting down the number of operations which will enable it to catch up with said modified signal. When this is no longer the case, it assumes, on the contrary, a more irregular shape but its variations are reduced, so that it keeps giving a good approximation of the signal to be transmitted.

Figure 2:
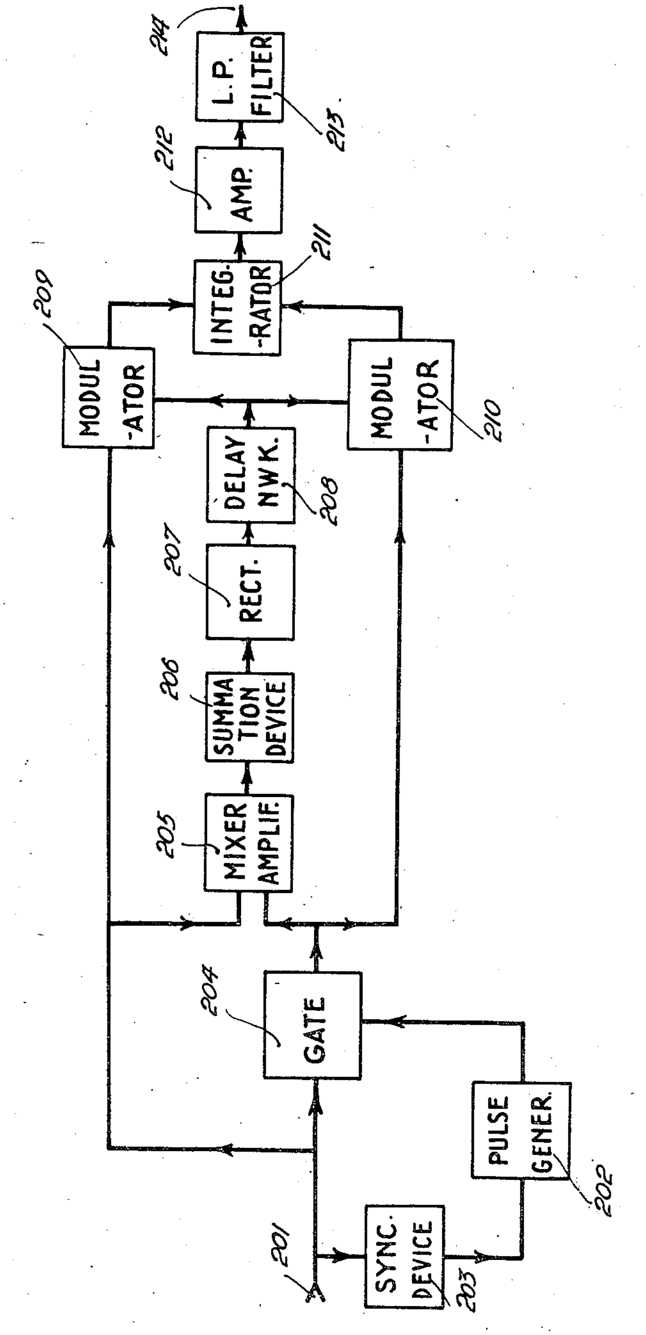
Figure 2 shows, diagrammatically, a one wire diagram of a receiving device.

In Figure 2, representing diagrammatically a receiving station, 201 represents the terminals of the circuit through which arrive, from a transmission circuit, a sequence of recurrent pulses individually characterized by their presence or absence, for instance positive or zero. 202 represents a generator of recurrent pulses having the same repetition frequency as the received pulses, 203 represents a synchronizing device of any well known type, linking the repetition frequency of the pulses delivered by 202 with those of the pulses received at 201; this device may be of any known type.

204 designates an anti-coincidence type of electronic gate which passes the pulses, of a negative polarity, supplied by 202 only when the pulses received are zero; 204, consequently, delivers a sequence of intermittent negative pulses, complementary to the positive pulses of the sequence received at 201.

The two complementary sequences are applied to a mixer-amplifier 205, which delivers a complete sequence of pulses individually positive or negative. This sequence is applied, as in the device shown in Figure 1, to a weighted summation device 206, to a rectifier 207 and to a delay network 208.

The delayed signal from 206 controls two modulators in amplitude 209 and 210 to which are respectively applied the partial sequences of positive and negative pulses from 201 and 204. The pulses thus modulated in amplitude are integrated in an integrator network 211, amplified in an amplifier 212 and filtered in a low pass filter 213.

The signal received at 214 is thus reconstituted in the same manner in which the comparison signal is generated in the sending device. For the reasons indicated in this respect, it reproduces the shape of the signal to be transmitted with good accuracy.

Most of the elements which are represented in the diagrams of Figures 1 and 2 are elements which are commonly used in the pulse technique and they do not require a more detailed description.

Figure 3:
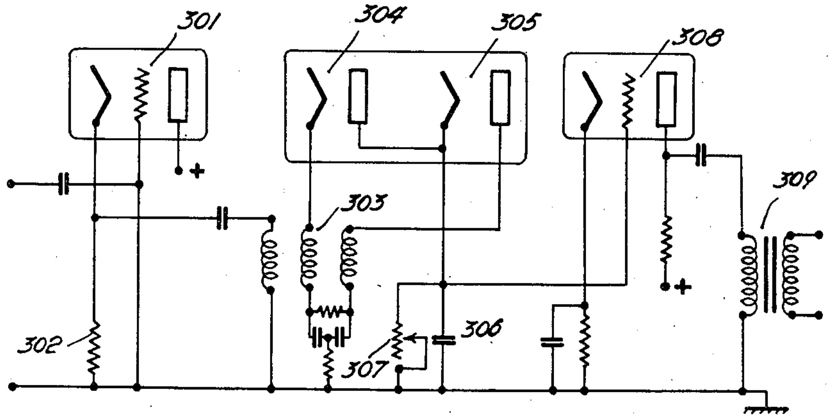
Figure 3 shows one mode of embodiment of a weighted summation element used in an embodiment of the invention.
Figure 4:
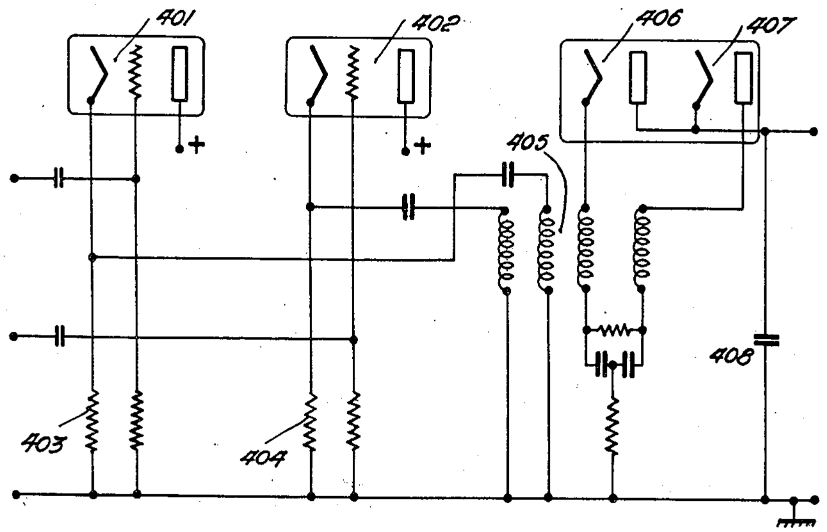
Figure 4 represents one mode of embodiment of an integrator also used in the putting in application of the invention.

Only the "weighted summation devices," respectively 11 in Figure 1 and 206 in Figure 2, as well as the integrators, respectively 16 in Figure 1 and 211 in Figure 2 will advantageously be described in greater detail, according to a practical mode of embodiment given by way of example and represented in Figures 3 and 4.

According to Figure 3, the sequence of recurrent pulses of constant amplitude but variable polarities is applied to an electronic tube 301, used as an amplifier with a cathode resistance 302 in the cathode circuit. This amplifier transfers pulses, by means of a transformer having a primary winding and two secondary windings 303 and of two diodes 304 and 305 to an integration condenser 306 in parallel with a discharge resistance 307. The resulting voltage obtained at the terminals of this condenser is amplified by an amplifier tube 308 and applied to the output terminals of the summation device by a transformer 309.

According to Figure 4, the two sequences of intermittent and amplitude modulated pulses, of opposite polarities, are applied, respectively, to two amplifier tubes 401 and 402 provided with load resistances 403 and 404 in their cathode circuits. The pulses thus amplified are transferred, by means of a four-winding transformer 405 and two diodes 406 and 407 to the integration condenser 408, the terminals of which constitute the output terminals of apparatus 211 in Figure 2.

I claim:

1. In a telecommunication system including a sending end, a transmission circuit and a receiving end and in which intelligence is transmitted in the form of recurrent electric pulses each of which is of one or the other of two possible signalling conditions according to whether the instantaneous amplitude sampled at recurrent instants of an intelligence signal of variable amplitude and constant polarity exceeds or not that of a comparison signal generated at said sending end and derived from said transmitted pulses, the method consisting in forming said comparison signal by continuously producing a sequence of constant amplitude pulses derived from said transmitted pulses and individually having a positive or a negative polarity according to the individual signalling condition of said transmitted pulses, deriving from said sequence at any instant a first auxiliary signal by integrating in time of said sequence after multiplying the individual amplitude of each pulse of said sequence produced previous to said instant by a numerical factor decreasing with the increasing time rank of said pulse counted from said instant, deriving from said first auxiliary signal, a second auxiliary signal by rectifying said first auxiliary signal so as to preserve its instantaneous amplitude while giving it a constant polarity, continuously amplitude modulating above said pulse sequence proportionally to the instantaneous amplitude of said second auxiliary signal, time integrating the so-obtained amplitude-modulated pulse sequence and adding to the latter integrated sequence a signal component of constant amplitude and polarity, whereby said comparison signal is obtained.

2. In a telecommunication system including a sending end, a transmission circuit and a receiving end and in which intelligence is transmitted in the form of recurrent electric pulses each of which is of one or the other of two possible signalling conditions according to whether the instantaneous amplitude sampled at recurrent instants of an intelligence signal of variable amplitude and constant polarity exceeds or not that of a comparison signal generated at said sending end and derived from said transmitted pulses, a transmitting device comprising means for transforming an alternating current intelligence signal to be transmitted into a unidirectional signal by adding thereto a direct-current component, a generator of periodic pulses, a comparator controlled by pulses from said generator and fed on one hand from said unidirectional signal and on the other hand from a comparison signal, said comparator delivering a difference signal of one or of the other polarity according to whether the instantaneous amplitude of said unidirectional signal exceeds or not that of said comparison signal, a clipping amplifier fed from said difference signal and delivering a clipped pulse sequence, a first and a second gate devices controlled by pulses from said generator and to both of which said clipped pulse sequence is applied and respectively delivering at their outputs a positive polarity pulse sequence and a negative polarity pulse sequence, an amplifier fed from one of said positive and negative polarity pulse sequences and impressing it upon a transmission circuit, a mixer amplifier adding said positive and negative polarity pulse sequence from said first and second gate devices so as to form an added pulse sequence including pulses of constant amplitude and of either polarity, a summation device fed from and integrating in time the pulses of said added pulse sequences with a predetermined time constant, a rectifier fed from the integrated signal from said summation device and delivering a rectified signal of same instantaneous amplitude as the latter integrated signal but of a constant polarity, a delay network fed from said rectified signal, a first and a second amplitude modulators fed from said delay network and respectively controlled by pulses from said first and second gate devices, means for adding modulated pulses from both of said modulators, an integrator integrating said added modulated pulses in time and means for adding to said integrated modulated pulses a direct current component, whereby said comparison signal is obtained.

3. A transmitting device as claimed in claim 2, wherein said summation device includes an electron tube having a cathode, a control grid and an anode, a first resistance connecting said cathode to a point at a constant potential, a transformer with a primary and two secondary windings, said primary winding being connected on one hand through a condenser to said cathode and on the other hand to said point at a constant potential, two series-connected rectifying diodes respectively fed from said two secondary windings and the currents of which are fed to a condenser in parallel connection with a second resistance, and a further electron tube amplifying voltage developed across said second resistance and feeding said amplified voltage to said rectifier.

4. A transmitting device as claimed in claim 2, wherein said adding means and integrator include a first and a second electron tubes each having at least a cathode, a control grid and an anode, a four-winding transformer two of the windings of which are respectively connected to the cathode of each one of said first and second tubes and the two other windings of which are respectively connected by one of their ends to two series connected rectifying diodes, means for connecting the common point of said series connected diodes to one electrode of an integrating condenser the other electrode of which is connected to a point at a constant potential, means for connecting the other ends of said two other windings to said point at a constant potential and means for respectively applying to the control grids of said electron tubes modulated pulse voltages from said amplitude-modulators.

5. In a telecommunication system including a sending end, a transmission circuit and a receiving end and in which intelligence is transmitted in the form of recurrent electric pulses each of which is of one or the other of two possible signalling conditions according to whether the instantaneous amplitude sampled at recurrent instants of an intelligence signal of variable amplitude and constant polarity exceeds or not that of a comparison signal generated at said sending end and derived from said transmitted pulses, a receiving device comprising means for receiving recurrent pulses of one or the other of said two possible signalling conditions transmitted through a transmission circuit, a generator of periodic pulses of recurrence frequency equal to that of said recurrent pulses, means for deriving from said received pulses a first and a second pulse sequences comprising respectively only positive polarity and only negative polarity pulses according to the signalling condition of each one of said received pulses, a mixing amplifier fed from said first and second pulse sequences and delivering an added pulse sequence including pulses of constant amplitude and of either polarity, a summation device fed from and integrating in time said added pulse sequence with a predetermined time constant, a rectifier fed from signal integrated in said summation device and feeding a delay network, a first and a second amplitude modulators fed from said delay network and respectively controlled by pulses from said first and second pulse sequences, means for adding modulated pulses from both said modulators, an integrator integrating said added modulated pulses in time, a low-pass filter fed from signal integrated in said integrator and means for impressing signal from said low-pass filter upon a utilization circuit.

6. A receiving device as claimed in claim 5, wherein said summation device includes an electron tube having a cathode, a control grid and an anode, a first resistance connecting said cathode to a point at a constant potential, means for applying pulses of said added pulse sequence to the control grid of said tube, a transformer with a primary and two secondary windings, said primary winding being connected on one hand through a condenser to said cathode and on the other hand to said point at a constant potential, means for respectively connecting each one of two series-connected rectifying diodes to one end of one of said two secondary windings, means for connecting the common point of said series connected diodes to one electrode of a condenser in parallel connection with a second resistance, said condenser having its other electrode connected to said point at a constant potential, means for connecting the other end of said secondary windings to said point at a constant potential and means for applying to a further electron tube voltage developed across said second resistance and for applying the latter voltage amplified through said tube to said rectifier.

7. A receiving device as claimed in claim 5, wherein said adding means and integrator include a first and a second electron tubes each having at least a cathode, a control grid and an anode, a four-winding transformer two of the windings of which are respectively connected to the cathodes of each one of said first and second tubes and the two other windings of which are respectively connected by one of their ends to two series connected rectifying diodes, means for connecting the common point of said series connected diodes to one electrode of an intergrating condenser the other electrode of which is connected to a point at a constant potential, means for connecting the other ends of said two other windings to said point at a constant potential and means for respectively applying to the control grids of said electron tubes modulated pulse voltages from said amplitude-modulators.

References Cited in the file of this patent

UNITED STATES PATENTS 2,711,443 Blonde ---------------- June 21, 1955